US006752972B1

(12) United States Patent
Fraim et al.

(10) Patent No.: US 6,752,972 B1
(45) Date of Patent: Jun. 22, 2004

(54) PLASMA PROCESSING METHOD AND APPARATUS

(75) Inventors: Michael Fraim, Bakersfield, CA (US); Rick B. Spielman, Albuquerque, NM (US); Robert R. Schiewe, Bakersfield, CA (US)

(73) Assignee: Essox Research and Development, Inc.

( * ) Notice: Subject to any disclaimer, the term of this patent is extended or adjusted under 35 U.S.C. 154(b) by 0 days.

(21) Appl. No.: 09/569,087

(22) Filed: May 10, 2000

(51) Int. Cl.$^7$ .............................. A23K 9/00; H01J 7/24; H05B 31/24; H05B 31/00
(52) U.S. Cl. .................. 422/198; 422/186; 219/121.11; 219/121.36; 219/121.46; 219/121.49; 219/3.5; 219/111.21
(58) Field of Search ................................. 422/198, 186; 219/121.11, 121.36, 121.46, 121.49; 315/111.21

(56) References Cited

U.S. PATENT DOCUMENTS

| | | |
|---|---|---|
| 4,162,901 A | 7/1979 | Enegess |
| 4,268,765 A | 5/1981 | Hoover |
| 4,285,701 A | 8/1981 | Schlenker |
| 4,759,775 A | 7/1988 | Peterson |
| 4,991,797 A | 2/1991 | Miller |
| 5,132,512 A | 7/1992 | Sanders |
| 5,257,757 A | 11/1993 | Paul |
| 5,305,610 A | 4/1994 | Bennett |
| 5,310,988 A | 5/1994 | Couch |
| 5,452,866 A | 9/1995 | Bulman |
| 5,560,844 A | 10/1996 | Boulos |
| 5,659,173 A | 8/1997 | Putterman |
| 5,685,997 A | 11/1997 | LoPresti |
| 5,723,045 A | 3/1998 | Daman |
| 5,903,976 A | 5/1999 | Beaurain |
| 5,932,182 A | 8/1999 | Blaney |

OTHER PUBLICATIONS

R. Echigo, "High Transfer Augmentation in High Temperature Heat Exchangers," High Temperature Equipment, 1986 Hemisphere Publishing Corporation, pp. 41–71.
E.D. Fedorovich, B.L. Pascar, "High Temperature Recuperative Heat Exchangers," High Temperature Equipment, 1986, Hemisphere Publishing Corporation, pp. 151–175.
M. Dalle Donne, "Heat Exchangers for High Temperature Gas–Cooled Nuclear Power Reactors," High Temperature Equipment, 1986 Hemisphere Publishing Corporation, pp. 177–209.

*Primary Examiner*—Glenn Caldarola
*Assistant Examiner*—Alexa Doroshenk
(74) *Attorney, Agent, or Firm*—James M. Duncan (57) ABSTRACT

A plasma processing apparatus includes a first chamber having a first wall with an inner peripheral surface and an outlet. A plurality of fluid supplying outlets are disposed along the first wall and are configured to supply a cooling fluid into the first chamber that travels in a circumferential direction around the inner peripheral surface of the first wall and in a direction towards the outlet. The cooling fluid exiting the plurality of fluid supplying outlets forms a cooling layer for cooling the inner peripheral surface of the first wall, and the outlet is configured for allowing the cooling fluid to exit therethrough while retaining the plasma within the chamber.

69 Claims, 6 Drawing Sheets

PLASMA PROCESSING METHOD AND APPARATUS

BACKGROUND OF THE INVENTION

The present invention is directed to devices that use plasma (very hot, ionized gases) for processing materials and for other industrial applications and, more particularly to a method and apparatus for cooling the chamber and chamber walls used to contain the plasma.

Plasmas confined within chambers are used to process materials in many industrial applications. For example, a toxic waste product may be processed by the plasma to convert the waste product into a nontoxic material. However, some waste products require very high temperatures in excess of 5,000° F. to confidently decompose the waste product into nontoxic materials. This, in turn, requires careful selection of a material used to construct a chamber that can contain such a high temperature plasma and/or careful attention as to how the chamber is cooled. In some applications the plasma is allowed to contact (or cannot be prevented from contacting) the inner peripheral surface of the chamber which, in turn, causes erosion and/or corrosion of the inner peripheral surface of the chamber and release of impurities to the plasma. In these applications the chamber is replaced when the amount of erosion and/or corrosion exceeds a predefined limit. However, in very high temperature applications the heat generated by the plasma may be sufficient to destroy the chamber very quickly, so merely replacing the chamber is not a realistic option. Consequently, a proper method for cooling the chamber must be devised.

In magnetohydrodynamic (MHD) systems, a plasma is passed through a duct containing a magnetic field in order to generate an electrical current. In such systems it is known to form the duct walls with a porous material and then flow a gas through the porous duct walls to form a protective layer between the plasma and the inner peripheral surface of the duct wall. The protective layer may be used to protect electrodes, electrically conducting wall segments and/or electrically insulating wall segments from erosion, corrosion, evaporation or other deterioration. The protective layer flows with the plasma through the duct, thus helping to prevent contact between the duct wall and the plasma. While this technique is useful in relatively low temperature plasma flow systems, it is not as useful in systems that employ a very high temperature plasma, and especially not in systems that require the plasma to be confined within a chamber. Additionally, cool plasmas near the walls and electrodes of an MHD generator significantly reduce the generator efficiency. In some systems that employ a very high temperature plasma, radiation (e.g., x-ray, ultraviolet, infrared, etc.) may be emitted from the plasma. Such radiation is absorbed on or is partially reflected by the inner peripheral surface of the duct or chamber and eventually overheats the duct or chamber, or causes radiative assisted ablation of the chamber wall. Also, such plasma flow systems require the plasma to flow with the protective layer out of the duct or chamber.

Some low pressure plasma systems (P approximately equal to $10^{-6}$ atmosphere) use magnetic fields to confine the plasma within the chamber. In these systems the plasma still tends to wobble or randomly move about the chamber and migrate toward the walls of the chamber due to fluctuating magnetic fields and turbulence in the rotating plasma. Computerized control of the magnetic field and energy densities helps to prevent wobbles in the plasma. However, as the plasma power levels and energy densities increase, the turbulence and increased plasma fluctuations cause the failure of the computer controlled magnetic field and the plasma touches the chamber wall. When the plasma touches the chamber wall, part of the chamber wall ablates and causes the plasma to move away from the wall. Of course, such ablation eventually requires replacement of the chamber. While such a magnetic field technique may work in lower energy density plasma systems with relatively slow deterioration of the chamber wall, any contact between the plasma and the wall in high energy density plasma systems could cause immediate destruction of the chamber.

In a plasma torch, a fine plasma arc is passed through a nozzle, and the plasma arc emerging from the nozzle is used to cut a material such as metal sheeting. During the cutting operation, hot molten or gaseous metal waste may impinge upon the nozzle and cause deflection of the plasma arc or a direct short to the metal. If the plasma arc contacts the inner nozzle wall, arcing and deterioration of the surface forming the nozzle orifice occurs, resulting in a reduced penetration rate, an increase in the roughness of the finished metal surface, and premature failure of the nozzle. One technique used to help stabilize the plasma arc is to flow a protective layer of a gas around the inner peripheral surface of the nozzle in a rotating vortex pattern. The vortex helps to contain and stabilize the plasma by providing a pressure containment and simultaneously imparting some rotation to the plasma jet. The cool protective layer helps to prevent contact between the plasma arc and the side of the nozzle. However, as with the use of a protective layer in MHD systems, this technique requires the plasma to exit with the protective layer.

Even in plasma systems that use a protective layer between the plasma and the chamber wall, the protective layer may not be adequate to fully protect the duct or nozzle wall when using very high temperature plasmas. One known method of accommodating higher temperature plasmas in a plasma torch is to use a liquid such as water to form the protective layer. The water undergoes a phase change from a liquid to a gaseous state as it is introduced into the nozzle. The phase change absorbs much more heat than is ordinarily possible using protective layers formed by gas alone, thus resulting in better cooling. However, as noted above, the techniques used in plasma torches also require the plasma to exit the nozzle with the protective layer.

SUMMARY OF THE INVENTION

The present invention is directed to a plasma processing system wherein a protective layer is formed between the plasma and a chamber in such a manner that the material forming the protective layer is allowed to exit the chamber without additionally requiring the plasma to exit the chamber. In one embodiment of the present invention, a plasma processing apparatus includes a first chamber having a first wall with an inner peripheral surface and an outlet. A plurality of fluid supplying outlets are disposed along the first wall and are configured to supply a cooling fluid into the first chamber that travels in a circumferential direction around the inner peripheral surface of the first wall and in a direction towards the outlet. The cooling fluid exiting the plurality of fluid supplying outlets forms a cooling layer for cooling the inner peripheral surface of the first wall, and the chamber is configured for allowing the cooling fluid to exit therethrough while substantially retaining the plasma therein.

In another embodiment of the present invention, a plasma processing apparatus includes a first chamber having a first wall with an inner peripheral surface and an outlet. A plasma is disposed in the chamber, wherein the plasma emits electromagnetic radiation. A plurality of fluid supplying outlets are disposed along the first wall and are configured to supply a cooling fluid into the first chamber to form a cooling layer for cooling the inner peripheral surface of the first wall. The chamber is configured for allowing the cooling fluid to exit therethrough while substantially retaining the plasma therein. A radiation communicating material is disposed at the first wall for communicating electromagnetic radiation from inside the first chamber away from the inner peripheral surface of the first wall. The radiation communicating material may communicate the electromagnetic material in a direction toward and/or away from the first chamber. If the plasma emits electromagnetic radiation having a wavelength in the ultraviolet range, then the radiation converting material may be of the type that absorbs electromagnetic radiation having a wavelength in the ultraviolet range and converts the absorbed electromagnetic radiation into electromagnetic radiation having a wavelength in the infrared range. If the radiation converting material is of the type which emits the converted radiation in all directions, and if the first wall includes a material that is transparent to electromagnetic radiation having a wavelength in the infrared range, then the infrared radiation passing through the first wall serves to avoid heating the first wall, while the infrared radiation emitted back toward the plasma helps to avoid unnecessary cooling of the plasma.

In another embodiment of the present invention, a plasma processing apparatus includes a first chamber having a first wall with an inner peripheral surface and an outlet. A plasma is disposed in the chamber, and a plurality of fluid supplying outlets are disposed along the first wall and are configured to supply a cooling fluid into the first chamber that forms a cooling layer for cooling the inner peripheral surface of the first wall. The chamber is configured for allowing the cooling fluid to exit therethrough while substantially retaining the plasma therein. A cooling fluid source provides the cooling fluid to the plurality of fluid supply outlets, wherein the cooling fluid has a structure that undergoes a phase change in response to a temperature in the cooling layer for providing increased cooling ability. In higher temperature applications, the cooling fluid may have a structure that undergoes disassociation and/or ionization to provide even more cooling ability.

DETAILED DESCRIPTION OF THE EMBODIMENTS

Figure 1:
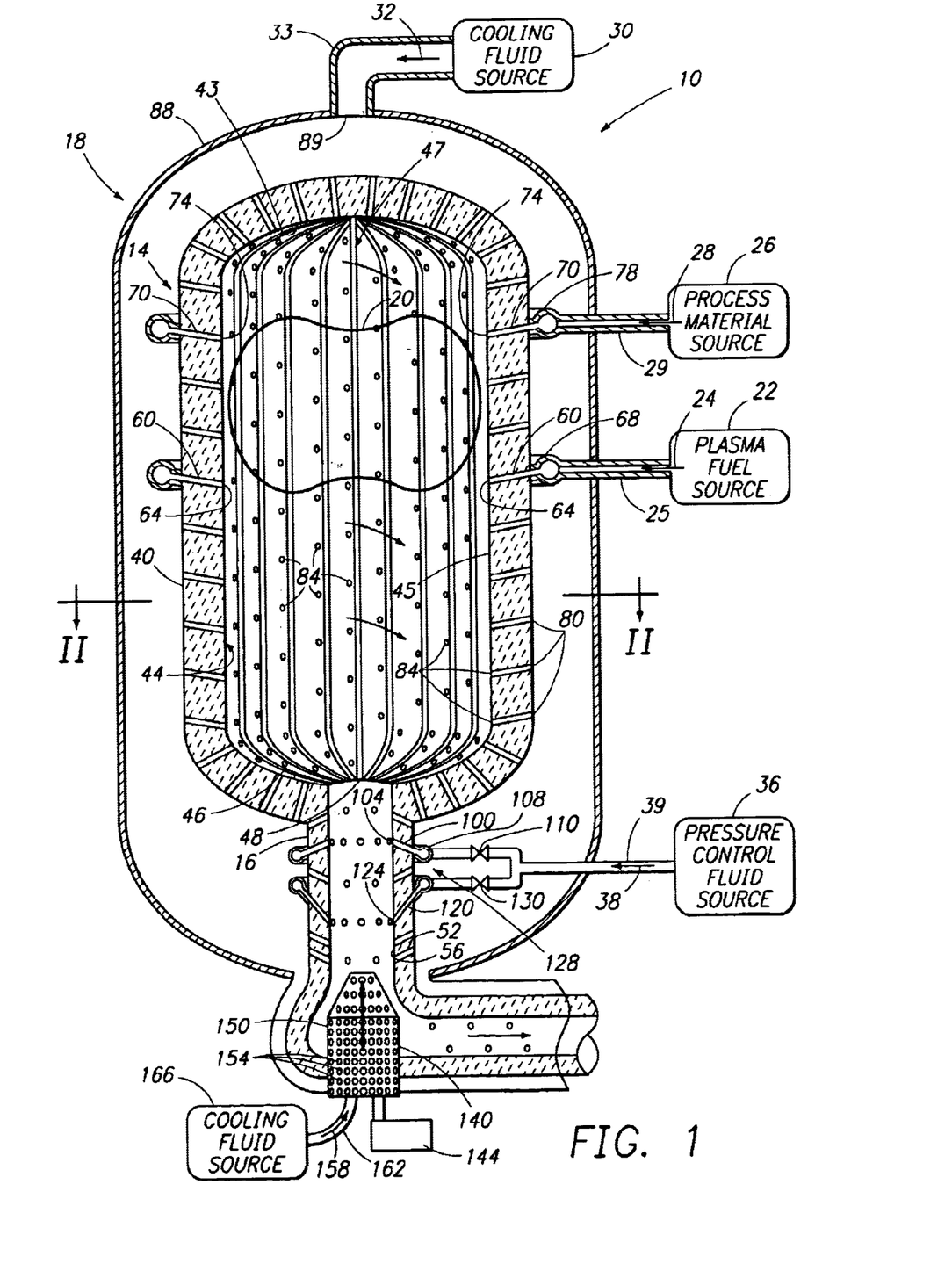
FIG. 1 is a cross sectional view of a particular embodiment of a plasma processing apparatus according to the present invention.
Figure 2:
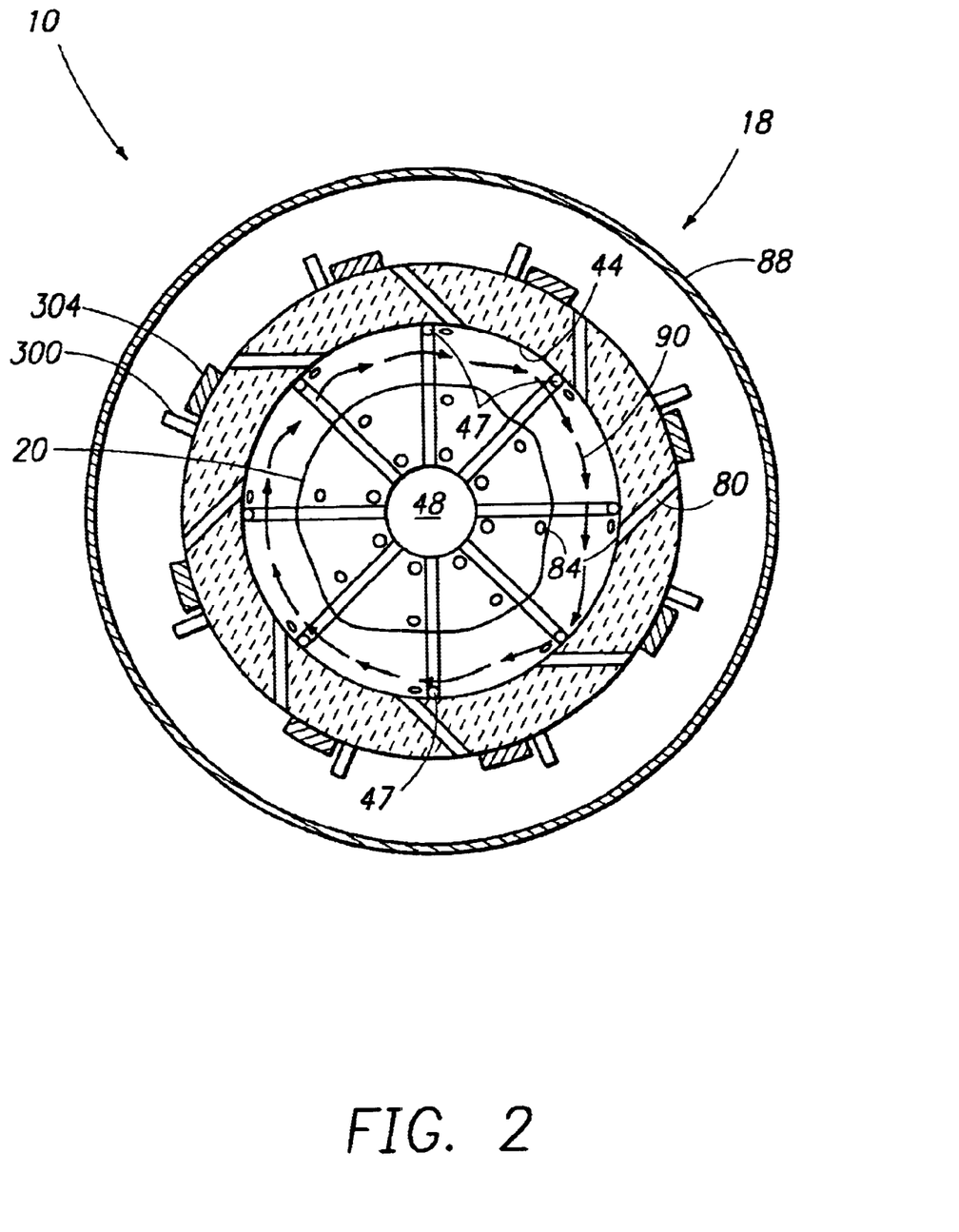
FIG. 2 is a view taken along line II—11 in FIG. 1.

FIG. 1 is a cross sectional view of a particular embodiment of a plasma processing apparatus 10 according to the present invention, and FIG. 2 is a view taken along line II—II in FIG. 1. As show in those figures, plasma processing apparatus 10 includes an inner plasma and material processing chamber 14, an outlet duct 16 disposed at a lower section of plasma and material processing chamber 14, an outer cooling fluid distribution chamber 18, a plasma fuel source 22 for supplying a fuel 24 such as, but not limited to, ionized hydrogen or some other plasma fuel into an upper section of plasma and material processing chamber 14 through a plasma fuel duct 25, a process material source 26 for supplying a process material 28 such as industrial waste, PCP, TCE, etc. into the upper section of plasma and material processing chamber 14 through a process material duct 29, a cooling fluid source 30 for supplying a cooling fluid 32 such as a gas a liquid, a solid powder, a solid suspended in a liquid, etc., into an upper section of cooling fluid distribution chamber 18 through a cooling fluid duct 33, and a pressure control fluid source 36 for supplying a pressure control fluid 38 into outlet duct 16 through a pressure control fluid duct 39. Depending upon the application, cooling fluid source 30 and pressure control fluid source 36 may be a single fluid source.

Plasma and material processing chamber 14 is used for processing material 28 using the heat generated by a plasma 20, the shape of which may be spherical, oblate or toroidal depending on the application. Plasma 20 may be formed by ionizing fuel 24 using combustion, laser heating, high amperage current, or some other known auxiliary heating method. Plasma and material processing chamber 14 includes a plasma and material processing chamber wall 40 having a concave, arcuate upper inner surface 43, an intermediate inner peripheral surface 45 and a concave, arcuate lower inner surface 46 defining an outlet 48 in fluid communication with outlet duct 16. Upper surface 43, intermediate inner peripheral surface 45 and lower inner surface 46 comprise the inner peripheral surface 44. Outlet duct 16 likewise has an outlet duct wall-52 having an inner peripheral surface 56.

Plasma and material processing chamber wall 40 has a generally oval vertical cross sectional shape as shown in FIG. 1 and a generally circular horizontal cross sectional shape as shown in FIG. 2. Plasma and material processing chamber wall 40 may be formed from any material that can withstand the pressures generated by plasma 20 and process material 28 and preferably also has substantial heat tolerance. For example, plasma and material processing chamber wall 40 may be formed from $Al_2O_3$, a ceramic material, etc. It is sometimes desirable to use a material lower in the periodic table to reduce transmutation of the material for specialized processes that involve ionizing radiation. Outlet duct wall 52 may be formed from the same material as plasma and material processing chamber wall 40, but it could be made from a different material depending upon the temperatures and pressures experienced by outlet duct 16.

A plurality of plasma fuel conduits 60 are disposed in plasma and material processing chamber wall 40 and define a corresponding plurality of plasma fuel outlets 64 along inner peripheral surface 44. Plasma fuel conduits 60 are in fluid communication with a plasma fuel manifold 68 which, in turn, is in fluid communication with plasma fuel duct 25 for receiving plasma fuel 24 from plasma fuel source 22. The number of plasma fuel conduits 60 and plasma fuel outlets 64 may vary depending upon the plasma fuel used and may consist of a single conduit and/or outlet, numerous multiple conduits and/or outlets clustered together, and so on. Separate nozzles could be used as well. In this embodiment, the plurality of plasma fuel conduits 60 are disposed evenly in a ring around inner peripheral surface 44. Also, plasma fuel conduits 60 are angled relative to inner peripheral surface 44 to promote the flow of plasma fuel 24 in a vortex within plasma and material processing chamber 14.

Likewise, a plurality of process material conduits 70 are disposed in plasma and material processing chamber wall 40 and define a corresponding plurality of process material outlets 74 along inner peripheral surface 44. Process material conduits 70 are in fluid communication with a process material manifold 78 which, in turn, is in fluid communication with process material duct 29 for receiving process material 28 from process material source 26. The number of process material conduits 70 and process material outlets 74 may vary depending upon the material being processed and may consist of a single conduit and/or outlet, multiple conduits and/or outlets clustered together, and so on. Separate nozzles could be used as well. In this embodiment, the plurality of process material conduits 70 are disposed evenly in a ring around inner peripheral surface 44. Also, process material conduits 70 are angled relative to inner peripheral surface 44 to promote the flow of process material 28 within a cooling fluid layer described in more detail below.

A plurality of cooling fluid conduits 80 are disposed in plasma and material chamber wall 40 and define a corresponding plurality of cooling fluid outlets 84 along inner peripheral surface 44. Cooling fluid conduits 80 are in fluid communication with cooling fluid distribution chamber 18 to form a transpiring wall. Although discrete channels have been shown for introduction of cooling fluid 32 into the plasma and material processing chamber 14 from cooling fluid distribution chamber 18, a porous media or some other media or structure capable of transferring cooling fluid 32 from outside chamber 14 into chamber 14 may also be used The same is true for the introduction of plasma fuel 24 and process material 28 into chamber 14. Cooling fluid distribution chamber 18 is defined by a cooling fluid distribution chamber wall 88 that sealingly surrounds outlet duct 16, plasma fuel duct 25, process material duct 29, cooling fluid duct 33, and pressure control fluid duct 39. Cooling fluid distribution chamber wall 88 defines a cooling fluid inlet 89 in fluid communication with cooling fluid duct 33 so that cooling fluid 32 may be pressurized within cooling fluid distribution chamber 18 and pass directly from cooling fluid distribution chamber 18 through cooling fluid conduits 80 and into plasma and material processing chamber 14. In this embodiment the pressure within cooling fluid distribution chamber 18 has the benefit of relieving the stress on plasma and material processing chamber wall 40 so that plasma and material processing chamber wall 40 can operate over a range of pressures other than ambient. In applications where it is desired to operate plasma and material processing chamber 14 under pressure, the pressure within fluid distribution chamber 18 allows material processing chamber wall 40 to withstand greater internal pressures. Of course, in other embodiments separate ducts could supply one or more cooling fluid conduits 80 with cooling fluid 32, and separate nozzles could be used to inject cooling fluid 32 into plasma and material processing chamber 18. If all cooling fluid conduits are served by separate ducts, then cooling fluid distribution chamber 18 could be pressurized by a separate pressure source, pressurization of cooling fluid distribution chamber 18 could be omitted, or cooling fluid distribution chamber 18 could be omitted entirely.

In this embodiment, cooling fluid conduits 80 and cooling fluid outlets 84 are angled or otherwise oriented relative to inner peripheral surface 44 such that cooling fluid 32 travels in a circumferential direction around inner peripheral surface 44 and in a direction toward outlet conduit 16. Also, cooling fluid outlets 84 are spaced apart from each other such that the cooling fluid 32 exiting the plurality of cooling fluid outlets forms a cooling layer 90 (FIG. 2) which coats the inner peripheral surface 44 and functions as a barrier between plasma 20 and inner peripheral surface 44 and cools plasma and material processing chamber wall 40. While the required spacing of cooling fluid outlets 84 will typically depend upon the viscosity of the cooling fluid and the rate of flow, an overlap of approximately 50% of the flow pattern from each cooling fluid outlet 84 should be sufficient for many applications. Of course, in some applications cooling fluid 32 need not travel in a circumferential direction as long as a sufficient cooling layer is formed for that application. Similarly, in some applications cooling layer 90 need not coat the entire inner peripheral surface 44 of chamber 14.

The thickness of cooling layer 90 also will depend upon the viscosity of the cooling fluid and the rate of flow, as well as the heat capacity of the cooling fluid. Based on the intended thickness of cooling layer 90, plasma fuel conduits 60 and/or process material conduits 70 may be oriented to flow plasma fuel 24 and/or process material 28 radially inwardly of cooling layer 90. For higher temperature plasmas it may be sufficient to orient process material conduits 70 to flow process material 28 into cooling layer 90 so that process material 28 is processed within cooling layer 90 rather than directly within plasma 20.

Cooling fluid 32 may be a gas, a liquid, a solid (whether or not entrained in a gas or liquid), or any other combination of these materials. In lower temperature applications a gas such as air, He, $CO_2$, $CH_4$, etc., may suffice as cooling fluid 32. In higher temperature applications, a material such as, but not limited to, water, hydrocarbons, or solids in a carrier fluid or another material that undergoes a phase change in response to the temperature of plasma 20 may be used as cooling fluid 32 because of the significantly greater amount of heat absorption that occurs as a result of the phase change. Likewise, a material such as gas, liquid, or solids, or a composite that undergoes molecular disassociation or ionization in response to the temperature of plasma 20 may be used as cooling fluid 32 because of the significantly greater amount of heat absorption that occurs as a result of such disassociation or ionization.

In this embodiment, plasma 20 is substantially retained within plasma and material processing chamber 14. This may be accomplished by the monitor and control mechanisms described below. Also, outlet 48 is configured such that the volume of cooling fluid 32 exiting outlet 48 is sufficient to create a back pressure to prevent thermal ablation of inner peripheral surface 44.

To further help control the pressure at outlet 48, a plurality of pressure increasing conduits 100 are disposed in outlet duct wall 52 and define a corresponding plurality of pressure increasing outlets 104 along inner peripheral surf ace 56 of outlet duct wall 52. Pressure increasing conduits 100 are in fluid communication with a first pressure control fluid manifold 108 which, in turn, is in fluid communication with pressure control fluid duct 39 through a pressure control valve 110 for receiving pressure control fluid 38 from pressure control fluid source 36. In this embodiment, the plurality of pressure increasing conduits 100 are disposed evenly in a ring around inner peripheral surface 56 of outlet duct wall 52. Also, pressure increasing conduits 100 are angled relative to inner peripheral surface 56 of outlet duct wall 52 to promote the flow of pressure control fluid 38 radially inwardly and upwardly toward outlet 48 in a circumferential vortex flow. The radially inward and upward vortex flow helps to constrict the flow of fluid through outlet conduit 16 as well as provide increased back pressure at outlet 48. The upward flow disrupts the vortex flow of cooling fluid 32 and further helps to prevent plasma 20 from being drawn toward outlet conduit 16 (thus further retaining plasma 20 within chamber 14). If desired, the direction of rotation of the vortex created by pressure increasing outlets 104 may be opposite the direction of rotation of the vortex of cooling fluid 32, thus also disrupting the vortex flow of cooling fluid 32 and helping to prevent plasma 20 from being drawn toward outlet conduit 16. In general, any apparatus that disrupts the vortex flow of cooling fluid 32 (e.g., mechanical vortex breakers, etc.) can be used to help prevent plasma 20 from being drawn toward outlet conduit 16.

Likewise, a plurality of pressure decreasing conduits 120 are disposed in outlet conduit wall 52 and define a corresponding plurality of pressure decreasing outlets 124 along inner peripheral surface 56 of outlet duct wall 52. Pressure decreasing conduits 120 are in fluid communication with a second pressure control fluid manifold 128 which, in turn, is in fluid communication with pressure control fluid duct 39 through a pressure control valve 130 for receiving pressure control fluid 38 from pressure control fluid source 36. In this embodiment, the plurality of pressure decreasing conduits 120 are disposed evenly in a ring around inner peripheral surface 56 of outlet duct wall 52. Also, pressure decreasing conduits 120 are angled relative to inner peripheral surface 56 of outlet duct wall 52 to promote the flow of pressure control fluid 38 radially inwardly and downwardly away from outlet 48 in a circumferential vortex flow. The downward vortex flow helps to promote the flow of fluid through outlet conduit 16, thus decreasing the back pressure at outlet 48.

If desired, a valve 140 actuated by a valve motor 144 in the directions indicated by the bidirectional arrow may be disposed in outlet duct 16 to further control the pressure within outlet duct 16 and hence at outlet 48. Valve 140 may include an outer peripheral surface 150 defining a plurality of cooling outlets 154 for emitting a cooling fluid 158 received from a duct 162 connected to a valve cooling fluid source 166. The emitted cooling fluid 158 forms a protective cooling layer for outer peripheral surface 150. Cooling fluid source 166 may be a separate cooling fluid source, or it may be formed as a single cooling fluid source with cooling fluid source 30 and/or pressure control fluid source 36.

Another consideration is the effects of electromagnetic radiation emitted by plasma 20. For example, infrared radiation emitted by plasma 20 may impinge upon inner peripheral surface 44, thus causing undesirable heating of inner peripheral surface 44. One way to inhibit such heating is to use cooling layer 90 to absorb the infrared radiation emitted by plasma 20 and carry the heat generated by such radiation out through outlet 16. For example, carbon dioxide gas can be included in cooling layer 90. The carbon dioxide gas absorbs infrared radiation, thus allowing cooling layer 90 to inhibit the communication of the infrared radiation to inner peripheral surface 44 and carry the energy from the infrared radiation out of chamber 14. Alternatively, calcium carbonate particles may be entrained in cooling fluid 32. Radiation impinging upon the calcium carbonate particle disassociates the calcium carbonate molecules into calcium oxide and carbon dioxide, whereupon the carbon dioxide absorbs the infrared radiation as noted above.

Figure 3:
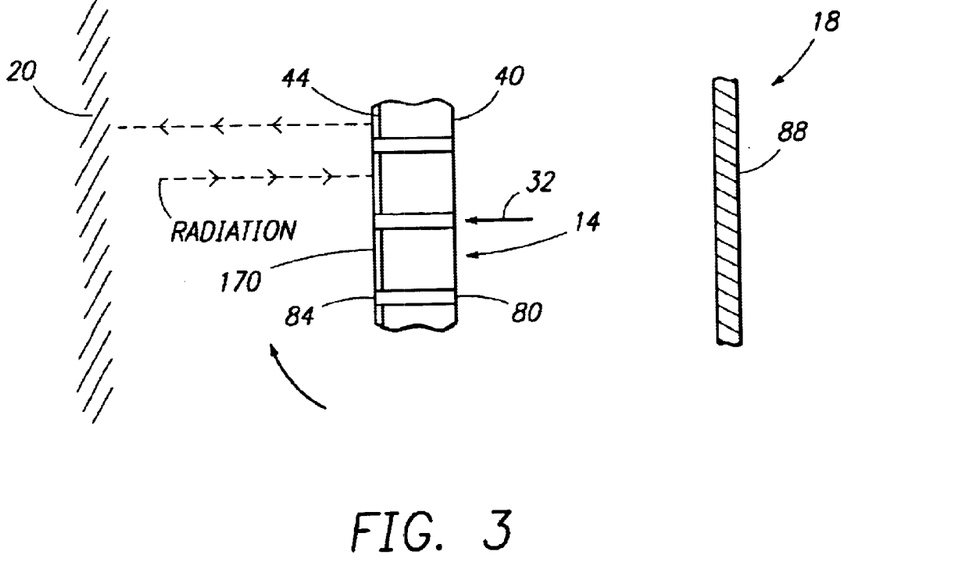
FIG. 3 is a detailed view showing a particular embodiment of a wall coating according to the present invention.

As the amount of infrared radiation increases, cooling layer 90 may not be able to absorb and remove all of the incident infrared radiation. In that case an infrared transmissive material such as alumina, sapphire, etc., may be used as part of chamber wall 40 and/or inner peripheral surface 44. Further improvement can be obtained by increasing the black body radiation effect of the external side of chamber wall 40 and thereby transmit the heat more effectively to fluid distribution chamber 18 for additional cooling. This can be accomplished, for example, by a zinc diboride coating. Another way to inhibit such heating, in addition to or in place of using such infrared transmissive material, is to reflect such infrared radiation back toward plasma 20. This can be accomplished by using an infrared reflective material that functions as a mirror, such as an infrared reflective layer 170 shown in FIG. 3. Layer 170 may be a composite layer comprising a gold, aluminum, nickel, etc. layer placed at chamber wall 40 with or without an additional protective layer such as a synthetic diamond coating disposed between the gold layer and plasma 20. Such transmissive or reflective material also can be used by itself without the additional radiation inhibiting function of cooling layer 90. Of course, such radiation reflective material also could be entrained within cooling fluid 32 so that cooling layer 90 itself acts as a reflective layer (in whole or in part), alone or in addition to layer 170, to achieve the same result.

Figure 4:
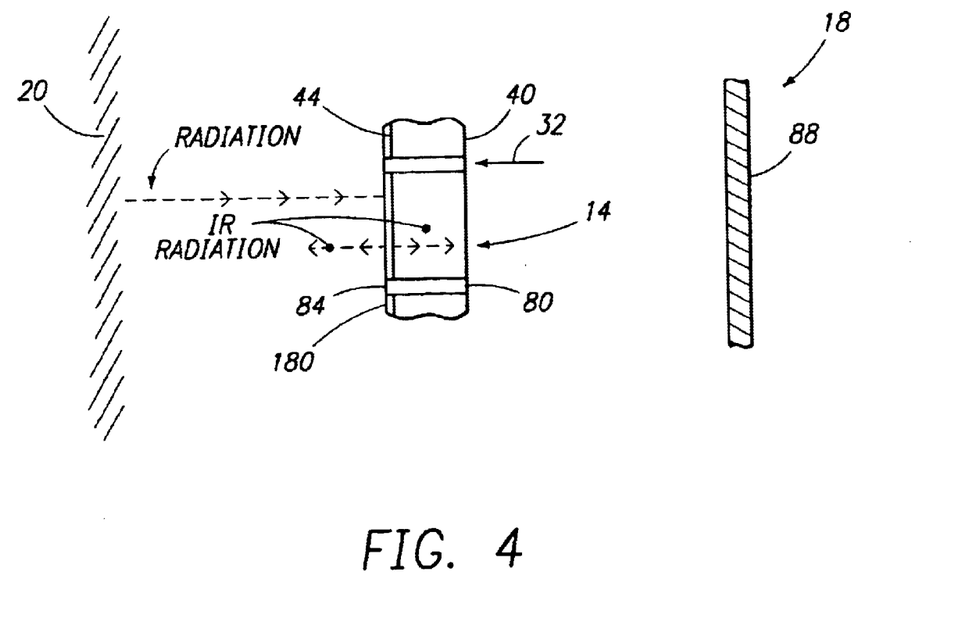
FIG. 4 is a detailed view of another embodiment of a wall coating according to the present invention.

If plasma 20 emits significant ultraviolet radiation, a fluorescing coating 180 may be used as part of chamber wall 40 and/or inner peripheral surface 44. FIG. 4 shows coating 180 disposed on inner peripheral surface 44 to absorb radiation emitted by plasma 20 and to convert the absorbed radiation into a longer wavelength that is radiated in all directions. If coating 180 is a material that absorbs electromagnetic radiation having a wavelength in the ultraviolet range and converts the absorbed electromagnetic radiation into electromagnetic radiation having a wavelength in the infrared range, then plasma and material processing wall 40 may be formed from an infrared transparent material such as monophase crystal materials (sapphire, etc.), nanophase materials, ceramics, etc. With such a structure, some of the infrared radiation re-emitted by coating 180 travels away from chamber 14 through plasma and material processing chamber wall 40 without heating it, and other infrared radiation re-emitted by coating 180 travels back toward plasma 20 to conserve the heat generated by plasma 20 in a productive manner. Of course, such radiation fluorescing material also could be entrained within cooling fluid 32 so that cooling layer 90 itself acts as a fluorescing layer (in whole or in part), alone or in addition to layer 180, to achieve the same result. Alternatively, a material that performs the fluorescing function could be entrained in cooling fluid 32, and the fluorescing function could occur prior to the cooling fluid entering cooling layer 90.

If plasma 20 emits significant x-ray or neutron radiation, cooling layer 90 could include diatomic gases such as nitrogen, oxygen, etc., injected at a sufficient pressure. Such gases then ionize and attenuate the radiation effects of the x-rays, such as the radiation ablation effect on inner peripheral surface 44. Additionally, ions of boron, lead, etc. could be entrained in cooling fluid 32 to act as an absorbing media. The details of such addition are strongly dependent on the spectrum of the x-ray or neutron radiation.

Another consideration is the monitoring and control of plasma 20 within chamber 14, and especially the ability of the apparatus to prevent contact between plasma 20 and inner peripheral surface 44 and to substantially retain plasma 20 within chamber 14. Of course, a small part of plasma 20 will become entrained within cooling layer 90, so it is not necessary to completely retain plasma 20 within chamber 14. Preferably, the majority of plasma 20 is retained within chamber 14, or at least enough to produce sufficient heat to produce the desired processing effect within plasma 20 or to process material 28.

The vortex flow of cooling fluid 32 causes plasma 20 to rotate. Unlike other materials that only expand in response to centrifugal forces caused by rotation, the plasma 20, being formed by ionized material, may contract as a result of magnetic forces caused by the rotation. This assumes that the centrifugal force caused by the rotation is less than the compression caused by the magnetic field induced by the rotation. Such compression helps to keep plasma 20 away from inner peripheral surface 44.

Figure 5:
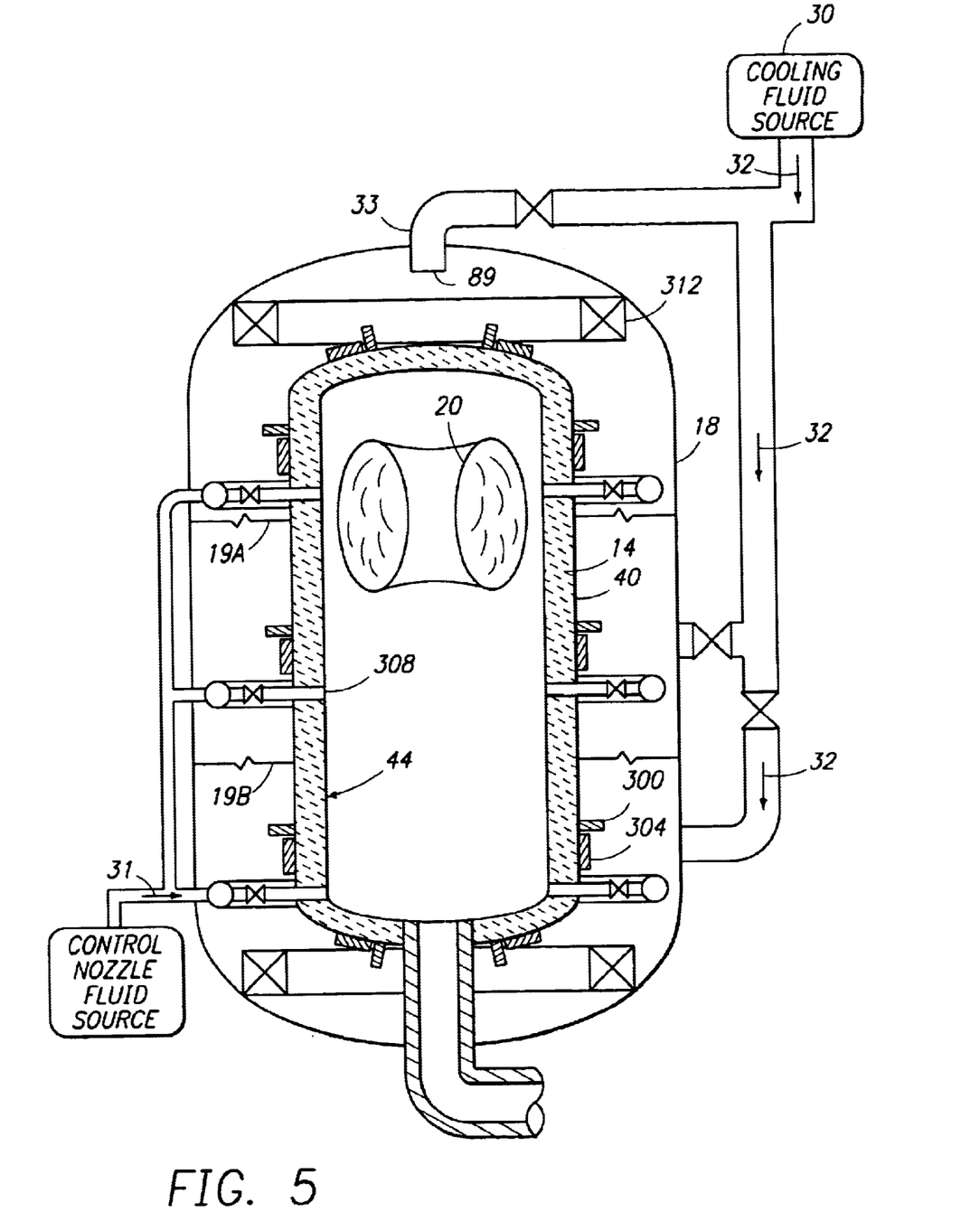
FIG. 5 is a cross sectional view of plasma processing apparatus showing a particular embodiment of a plasma monitoring and control system according to the present invention.

The outer boundary of plasma 20 may be detected using equally-spaced axial and radial arrays of magnetic, optical and/or acoustic sensors 300 (FIG. 5) either attached to wall 40 or placed in a convenient location away from wall 40 if the chosen sensor has the ability to sense the desired parameter without being in physical contact with wall 40. A magnetic sensor, such as a three-axis hall sensor, senses the magnetic field emitted by plasma 20. An optical sensor, such as an open-ended fiber optic cable, senses the light emitted by plasma. An acoustic sensor, such as a high temperature actively-cooled acoustic transducer, senses sound reflected from the boundary of plasma 20. Such a sound could be generated by the acoustic sensor itself, or by a separate acoustic transducer. If plasma 20 is approaching inner peripheral surface 44, such as may occur when process material is injected into chamber 14 or by mode flow, pressure waves generated by one or more acoustic transducers 304 disposed axially and radially around chamber 14 may be used to repel plasma 20 in the desired direction. Such acoustic pressure waves might also be used to control or drive impurities so as to prevent contamination of the plasma 20 with impurities from the process material 28 or the cooling fluid 32. Additionally, or in lieu of acoustic transducers 304, control nozzles 308 are disposed axially and radially around chamber 14 for injecting a fluid 31 into chamber 14 to repel plasma 20 in the desired direction. Control nozzles 308 may function separately from the orifices that introduce cooling fluid 32 into chamber 14, or they may be wholly or partially responsible for introducing cooling fluid 32 into chamber 14. Pressure separation baffles 19A and 19B may be installed in cooling fluid distribution chamber 18 to provide areas of different pressures outside of chamber 14. A magnetic field generator 312 may be used to further control the location of plasma 20, stabilize the rotation of plasma 20, and smooth the boundary layer of the plasma 20.

Another consideration is the ability to promote the coating of inner peripheral surface 44 with cooling fluid 32. In this embodiment, inner peripheral surface 44 has a texture appropriate to the process requirements. In lower flow (lower temperature) applications, inner peripheral surface 44 is textured to maximize laminar flow of cooling fluid 32. In higher flow (higher temperature) applications, inner peripheral surface 44 is textured with shapes or coatings to stabilize the flow. In this embodiment, vertically extending semi-cylindrical protrusions 47 are positioned about the inner peripheral surface 44 as shown in FIG. 2. Such protrusions cause miniature vortexes on the downstream side of protrusions 47, which in turn, tend to draw cooling fluid 32 toward inner peripheral surface 44.

Figure 6:
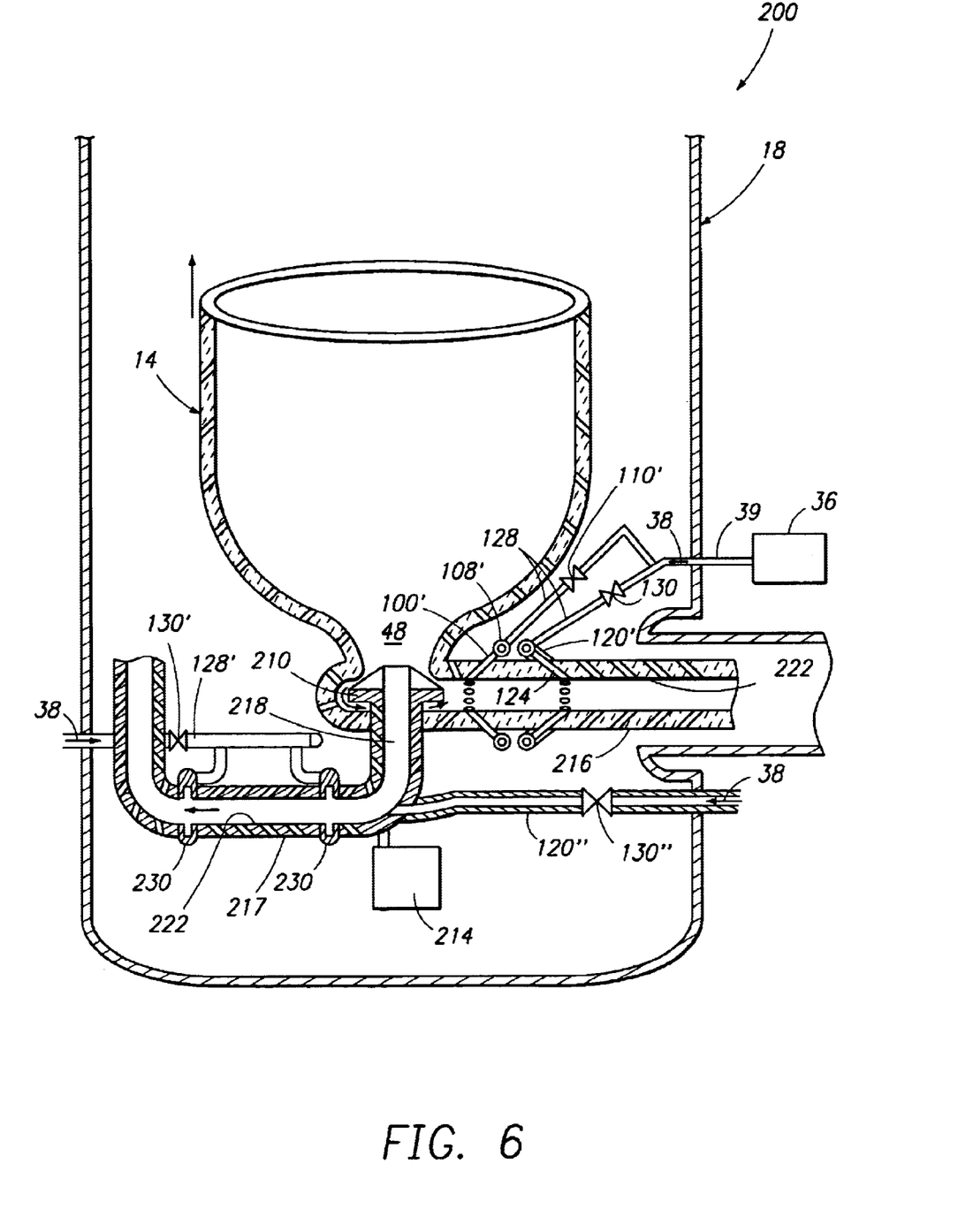
FIG. 6 is a cross sectional view of an alternative embodiment of a plasma processing apparatus according to the present invention.

FIG. 6 is a cross sectional-view of a plasma processing apparatus 200 which represents an alternative embodiment of the present invention. Plasma processing apparatus 200 includes a plasma and material processing chamber 14 and a cooling fluid distribution chamber 18 having generally the same structure as in the first embodiment, so a detailed description of those components shall be omitted. This embodiment differs from the first embodiment in that a valve 210 operated by a motor 214 serves not only to help control the pressure at outlet 48 but also to separate and recover materials entrained in cooling layer 90. Since cooling layer 90 is spinning in a vortex manner, heavier components entrained in the vortex will migrate radially outwardly and may pass around valve 210 and through outlet duct 216. Valve 210 is connected to a valve duct 217 with a central passage 218 defined by an inner peripheral surface 222 to recover lighter materials entrained in the inner portions of the vortex. As with the first embodiment, outlet duct 216 includes cooling fluid conduits (not shown) to cool the inner peripheral surface 222 as well as pressure decreasing conduits 120' to help decrease the back pressure at outlet 48. Valve duct 217 also includes cooling fluid conduits (not shown), pressure decreasing ducts 120" in fluid communication with manifold 128 and flexible couplings 230 that are themselves cooled by pressurized cooling fluid received, for example, from a separate cooling fluid source.

Figure 7:
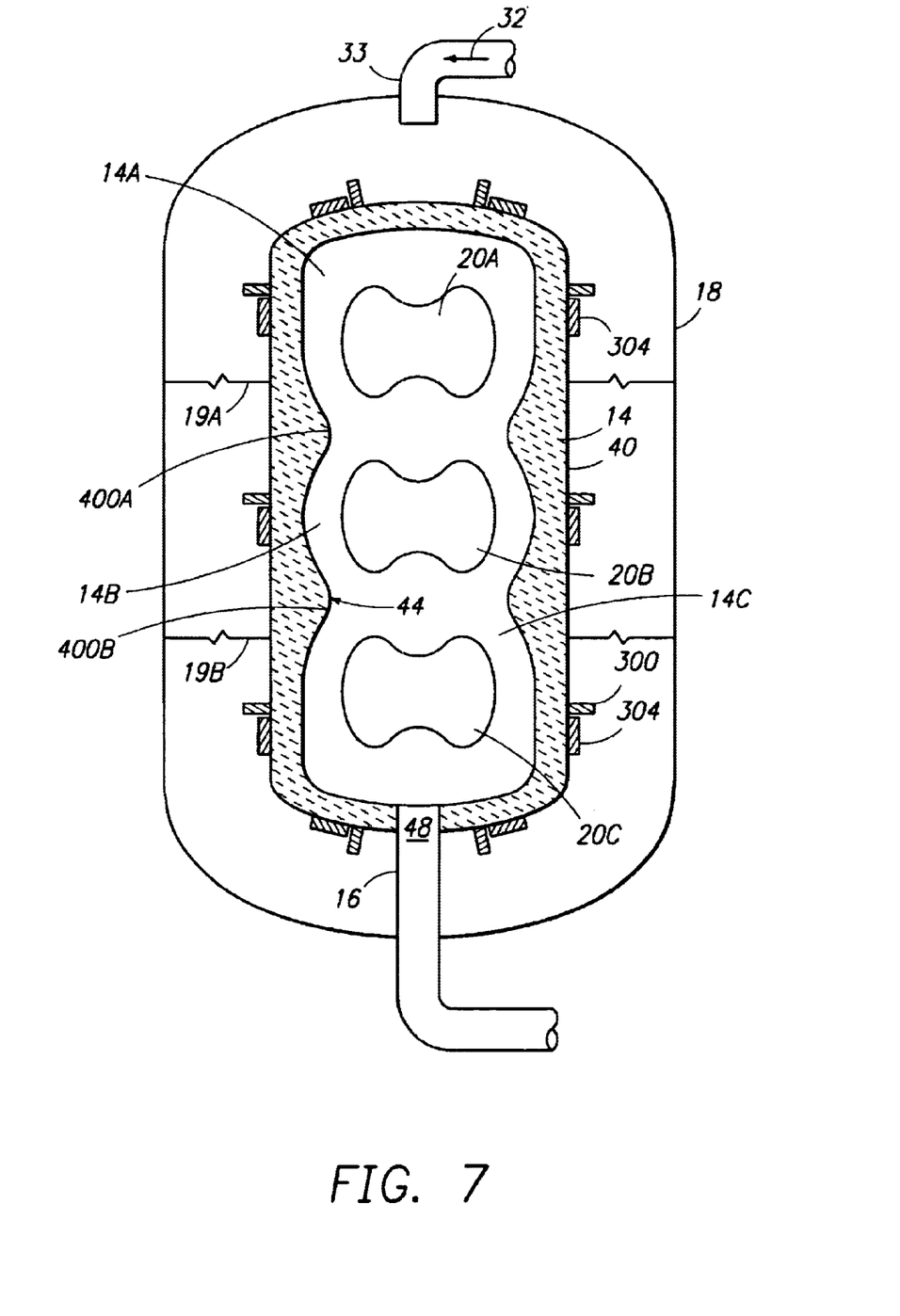
FIG. 7 is a cross sectional view of an alternative embodiment of a plasma processing apparatus according to the present invention.

While the above is a description of various embodiments of the present invention, further modifications may be employed without departing from the spirit and scope of the present invention. For example, separate cooling fluid conduits could be coupled to separate cooling fluid sources, and the separate cooling fluid conduits could be oriented to provide separate cooling layers comprising different materials. Similarly, separate process material conduits could be coupled to separate process material sources, and the separate process material sources could be angled differently to inject the process material into different cooling layers or into the cooling layer(s) and the plasma. For very high temperature applications, valves 140 or 210 could be omitted and the pressure at outlet 48 could be controlled exclusively by pressure increasing conduits 100 and/or pressure decreasing conduits 120. If desired, multiple plasma processing chambers 14A, 14B and 14C containing plasmas 20A, 20B and 20C, respectively, could be stacked as shown in FIG. 7, wherein plasma processing chambers 14A, 14B and 14C are separated by constricted orifices 400A and 400B. Pressure separation baffles 19A and 19B may be installed in cooling fluid distribution chamber 18 to provide areas of different pressures outside of the respective processing chambers 14A, 14B and 14C. This embodiment will use the same types of process structures and controls used in the previous embodiments.

The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Moreover, although the processing of waste has been disclosed as one possible application of the present invention, other applications are readily apparent to those skilled in the art, including the processing of the plasma itself, the processing of the cooling fluid, etc. The various techniques used to introduce cooling fluid 32 into chamber 14 also may be used to introduce plasma fuel 24 and process material 28 into chamber 14. Thus, the scope of the invention should not be limited by the specific structures disclosed or the apparent initial focus on a particular structure or feature.

What is claimed is:

1. A plasma processing apparatus comprising:
a first chamber having a first wall for containing a plasma, wherein the first wall has an inner peripheral surface and an outlet;
a plurality of fluid supplying outlets disposed along the first wall and configured to supply a cooling fluid into the first chamber that travels in a circumferential direction around the inner peripheral surface of the first wall and in a direction toward the outlet, wherein cooling fluid exiting the plurality of fluid supplying outlets forms a cooling layer for cooling the inner peripheral surface of the first wall; and
wherein the chamber is configured for allowing the cooling fluid to exit therethrough while substantially retaining the plasma therein.

2. The apparatus according to claim 1 further comprising a plasma fuel supplying outlet configured to supply a plasma fuel into the first chamber.

3. The apparatus according to claim 1 further comprising a process material supplying outlet configured to supply a process material into the cooling layer.

4. The apparatus according to claim 1 wherein the first chamber has an upper section and a lower section, and wherein the outlet is disposed at the lower section.

5. The apparatus according to claim 4 wherein the plurality of fluid supplying outlets are configured so that cooling fluid travels in a direction toward the lower section.

6. The apparatus according to claim 5 wherein the upper section has an upper inner surface, wherein the lower section has a lower inner surface, and wherein the outlet is disposed at the lower inner surface.

7. The apparatus according to claim 6 wherein the inner peripheral surface of the first wall has a substantially circular shape.

8. The apparatus according to claim 7 wherein the lower inner surface has a concave shape.

9. The apparatus according to claim 8 wherein the lower inner surface has an arcuate shape.

10. The apparatus according to claim 1 further comprising a plurality of fluid conduits defining at least some of the plurality of fluid supplying outlets.

11. The apparatus according to claim 10 wherein the plurality of fluid conduits are disposed in the first wall.

12. The apparatus according to claim 10 wherein the plurality of fluid conduits are oriented to direct the cooling fluid in the circumferential direction of the inner peripheral surface of the first wall and toward the outlet.

13. The apparatus according to claim 12 further comprising a plasma fuel supplying conduit oriented to supply a plasma fuel into the chamber radially inwardly of the cooling layer.

14. The apparatus according to claim 12 further comprising a process material supplying conduit oriented to supply a process material into the cooling layer.

15. The apparatus according to claim 1 wherein the outlet comprises an outlet conduit having an outlet inner peripheral surface.

16. The apparatus according to claim 15 further comprises a plurality of pressure controlling outlets configured to provide a pressure controlling fluid flow that travels in a circumferential direction around the outlet inner peripheral surface.

17. The apparatus according to claim 16 wherein the plurality of pressure controlling outlets are configured so that the pressure controlling fluid flow extends radially inwardly.

18. The apparatus according to claim 16 wherein the plurality of pressure controlling outlets are configured so that the pressure controlling fluid flow travels in a direction toward the first chamber.

19. The apparatus according to claim 16 wherein the plurality of pressure controlling outlets are configured so that the pressure controlling fluid flow travels in a direction away from the first chamber.

20. The apparatus according to claim 1 further comprising a second chamber having a second wall, wherein the first chamber is disposed in the second chamber.

21. The apparatus according to claim 20 wherein the plurality of fluid supplying outlets are in fluid communication with the second chamber.

22. The apparatus according to claim 21 further comprising a plurality of fluid conduits defining at least some of the plurality of fluid supplying outlets, wherein the plurality of fluid conduits extend through the first wall so that the first chamber is in fluid communication with the second chamber.

23. The apparatus according to claim 22 further comprising a cooling fluid inlet disposed in the second wall for supplying cooling fluid into the second chamber.

24. The apparatus according to claim 1 further comprising a cooling fluid source for providing the cooling fluid to the plurality of fluid supplying outlets.

25. The apparatus according to claim 24 wherein the cooling fluid includes a gaseous material.

26. The apparatus according to claim 24 wherein the cooling fluid includes a liquid material.

27. The apparatus according to claim 24 wherein the cooling fluid includes a solid material.

28. The apparatus according to claim 1 further comprising a radiation communicating material disposed at the first wall for communicating electromagnetic radiation from inside the first chamber away from the inner peripheral surface of the first wall.

29. The apparatus according to claim 28 wherein the radiation communicating material communicates the electromagnetic material in a direction away from the first chamber.

30. The apparatus according to claim 28 wherein the radiation communicating material communicates the electromagnetic material in a direction toward the first chamber.

31. The apparatus according to claim 28 wherein the radiation communicating material communicates the electromagnetic material in a direction toward and away from the first chamber.

32. The apparatus according to claim 28 wherein the radiation communicating material includes a material that absorbs electromagnetic radiation having a wavelength in an ultraviolet range and converts the absorbed electromagnetic radiation into electromagnetic radiation having a wavelength in an infrared range.

33. The apparatus according to claim 32 wherein the first-wall includes a material that is transparent to electromagnetic radiation having a wavelength in the infrared range.

34. A plasma processing apparatus comprising:
a first chamber having a first wall, wherein the first wall has an inner peripheral surface and an outlet;
a plasma disposed in the chamber;
a plurality of fluid supplying outlets disposed along the inner peripheral surface of the first wall and configured to supply a cooling fluid into the first chamber that travels in a circumferential direction around the inner peripheral surface of the first wall and in a direction toward the outlet, wherein cooling fluid exiting the plurality of fluid supplying outlets forms a cooling layer for cooling the inner peripheral surface of the first wall; and wherein the chamber is configured for allowing the cooling fluid to exit therethrough while substantially retaining the plasma therein.

35. The apparatus according to claim 34 wherein the plasma emits electromagnetic radiation having a wavelength in an ultraviolet range.

36. The apparatus according to claim 35 further comprising a radiation communicating material disposed at the first wall for communicating electromagnetic radiation from inside the first chamber away from the inner peripheral surface of the first wall.

37. The apparatus according to claim 36 wherein the radiation communicating material communicates the electromagnetic material in a direction away from the first chamber.

38. The apparatus according to claim 36 wherein the radiation communicating material communicates the electromagnetic material in a direction toward the first chamber.

39. The apparatus according to claim 36 wherein the radiation communicating material communicates the electromagnetic material in a direction toward and away from the first chamber.

40. The apparatus according to claim 36 wherein the radiation communicating material includes a material that absorbs electromagnetic radiation having a wavelength in the ultraviolet range and converts the absorbed electromagnetic radiation into electromagnetic radiation having a wavelength in an infrared range.

41. The apparatus according to claim 40 wherein the first wall includes a material that is transparent to electromagnetic radiation having a wavelength in the infrared range.

42. The apparatus according to claim 34 further comprising a cooling fluid source for providing the cooling fluid to the plurality of fluid supply outlets.

43. The apparatus according to claim 42 wherein the cooling fluid has a structure that undergoes a phase change in response to a temperature in the cooling layer.

44. The apparatus according to claim 43 wherein the cooling fluid includes a liquid material.

45. The apparatus according to claim 43 wherein the cooling fluid includes a solid material.

46. The apparatus according to claim 42 wherein the cooling fluid has a structure that undergoes disassociation in response to a temperature in the cooling layer.

47. The apparatus according to claim 46 wherein the cooling fluid includes a gaseous material.

48. The apparatus according to claim 46 wherein the cooling fluid includes a liquid material.

49. The apparatus according to claim 46 wherein the cooling fluid includes a solid material.

50. The apparatus according to claim 42 wherein the cooling fluid has a structure that undergoes ionization in response to a temperature in the cooling layer.

51. The apparatus according to claim 50 wherein the cooling fluid includes a gaseous material.

52. The apparatus according to claim 50 wherein the cooling fluid includes a liquid material.

53. The apparatus according to claim 50 wherein the cooling fluid includes a solid material.

54. A plasma processing apparatus comprising:
a first chamber having a first wall for containing a plasma, wherein the first wall has an inner peripheral surface and an outlet;
a plurality of fluid supplying outlets disposed along the first wall and configured to supply a cooling fluid into the first chamber that forms a cooling layer for cooling the inner peripheral surface of the first wall; and
radiation converting material disposed at the inner peripheral surface of the first wall that absorbs electromagnetic radiation having a wavelength in an ultraviolet range and converts the absorbed electromagnetic radiation into electromagnetic radiation having a wavelength in an infrared range.

55. A plasma processing apparatus comprising:
a first chamber having a first wall, wherein the first wall has an inner peripheral surface and an outlet;
a plasma disposed in the chamber;
a plurality of fluid supplying outlets disposed along the first wall and configured to supply a cooling fluid into the first chamber that forms a cooling layer for cooling the inner peripheral surface of the first wall;
wherein the chamber is configured for allowing the cooling fluid to exit therethrough while substantially retaining the plasma therein;
a cooling fluid source for providing the cooling fluid to the plurality of fluid supply outlets; and
wherein the cooling fluid has a structure that undergoes a phase change in response to a temperature in the cooling layer.

56. A plasma processing apparatus comprising:
a first chamber having a first wall, wherein the first wall has an inner peripheral surface and an outlet;
a plasma disposed in the chamber;
a plurality of fluid supplying outlets disposed along the first wall and configured to supply a cooling fluid into the first chamber that forms a cooling layer for cooling the inner peripheral surface of the first wall;
wherein the chamber is configured for allowing the cooling fluid to exit therethrough while substantially retaining the plasma therein;
a cooling fluid source for providing the cooling fluid to the plurality of fluid supply outlets; and
wherein the cooling fluid has a structure that undergoes disassociation in response to a temperature in the cooling layer.

57. A plasma processing apparatus comprising:
a first chamber having a first wall, wherein the first wall has an inner peripheral surface and an outlet;
a plasma disposed in the chamber;
a plurality of fluid supplying outlets disposed along the first wall and configured to supply a cooling fluid into the first chamber that forms a cooling layer for cooling the inner peripheral surface of the first wall;
wherein the chamber is configured for allowing the cooling fluid to exit therethrough while substantially retaining the plasma therein;
a cooling fluid source for providing the cooling fluid to the plurality of fluid supply outlets; and
wherein the cooling fluid has a structure that undergoes ionization in response to a temperature in the cooling layer.

58. A method of controlling a plasma process comprising the steps of:
disposing a plasma in a chamber having a first wall with an inner peripheral surface and an outlet;
flowing a cooling fluid circumferentially around the inner peripheral surface of the first wall and toward the outlet;

forming a cooling layer between the plasma and the inner peripheral surface of the first wall with the flowing cooling fluid; and allowing the cooling fluid to exit the outlet while substantially retaining the plasma within the chamber.

59. The method according to claim 58 wherein the step of allowing the cooling fluid to exit the outlet while substantially preventing the plasma from exiting the outlet comprises the step of preventing the plasma from exiting the outlet with the cooling fluid.

60. A method of controlling a plasma process comprising the steps of:
   disposing a plasma in a chamber having a first wall with an inner peripheral surface and an outlet;
   emitting, by the plasma, radiation having a wavelength in an ultraviolet range;
   converting, at the first wall, the electromagnetic radiation emitted from the plasma having a wavelength in the ultraviolet range into electromagnetic radiation having a wavelength in an infrared range.

61. A method of controlling a plasma process comprising the steps of:
   disposing a plasma in a chamber having a first wall with an inner peripheral surface and an outlet;
   forming a cooling layer with a cooling fluid between the plasma and the inner peripheral surface of the first wall;
   introducing a material into the cooling layer which undergoes a phase change in response to a temperature in the cooling layer;
   allowing the cooling fluid to exit the chamber through the outlet; and
   substantially retaining the plasma within the chamber.

62. A method of controlling a plasma process comprising the steps of:
   disposing a plasma in a chamber having a first wall with an inner peripheral surface and an outlet;
   forming a cooling layer with a cooling fluid between the plasma and the inner peripheral surface of the first wall;
   introducing a material into the cooling layer which undergoes disassociation in response to a temperature in the cooling layer;
   allowing the cooling fluid to exit the chamber through the outlet; and
   substantially preventing the plasma from exiting the chamber through the outlet.

63. A method of controlling a plasma process comprising the steps of:
   disposing a plasma in a chamber having a first wall with an inner peripheral surface and an outlet;
   forming a cooling layer with a cooling fluid between the plasma and the inner peripheral surface of the first wall;
   introducing a material into the cooling layer which undergoes ionization in response to a temperature in the cooling layer;
   allowing the cooling fluid to exit the chamber through the outlet; and
   substantially retaining the plasma within the chamber.

64. An apparatus for controlling a plasma process comprising:
   a chamber having a first wall with an inner peripheral surface and an outlet;
   a plasma disposed in the chamber;
   means for forming a cooling layer with the flowing cooling fluid between the plasma and the inner peripheral surface of the first wall; and
   means for allowing the cooling fluid to exit the outlet while substantially retaining the plasma within the chamber.

65. An apparatus for controlling a plasma process comprising:
   a chamber having a first wall with an inner peripheral surface and an outlet;
   a plasma disposed in the chamber, wherein the plasma emits radiation having a wavelength in an ultraviolet range; and
   radiation converting means disposed at the first wall for converting the electromagnetic radiation emitted from the plasma having a wavelength in the ultraviolet range into electromagnetic radiation having a wavelength in an infrared range.

66. An apparatus for controlling a plasma process comprising:
   a chamber having a first wall with an inner peripheral surface and an outlet;
   a plasma disposed in the chamber;
   means for forming a cooling layer with a cooling fluid between the plasma and the inner peripheral surface of the first wall;
   means for introducing a material into the cooling layer which undergoes a phase change in response to a temperature in the cooling layer; and
   means for allowing the cooling fluid to exit the chamber through the outlet while substantially retaining the plasma within the chamber.

67. An apparatus for controlling a plasma process comprising:
   a chamber having a first wall with an inner peripheral surface and an outlet;
   a plasma disposed in the chamber;
   means for forming a cooling layer with a cooling fluid between the plasma and the inner peripheral surface of the first wall;
   means for introducing a material into the cooling layer which undergoes disassociation in response to a temperature in the cooling layer; and
   means for allowing the cooling fluid to exit the chamber through the outlet while substantially retaining the plasma within the chamber.

68. An apparatus for controlling a plasma process comprising:
   a chamber having a first wall with an inner peripheral surface and an outlet;
   a plasma disposed in the chamber;
   means for forming a cooling layer with a cooling fluid between the plasma and the inner peripheral surface of the first wall;
   means for introducing a material into the cooling layer which undergoes ionization in response to a temperature in the cooling layer; and
   means for allowing the cooling fluid to exit the chamber through the outlet while substantially retaining the plasma within the chamber.

69. A method of controlling a plasma process comprising the steps of:
   forming a cooling layer with a flowing cooling fluid between the plasma and the inner peripheral surface of the first wall; and
   allowing the cooling fluid to exit the outlet while substantially preventing the plasma from exiting the outlet.

* * * * *